US006804645B1

(12) United States Patent
Kleinschmidt

(10) Patent No.: US 6,804,645 B1
(45) Date of Patent: Oct. 12, 2004

(54) DYNAMIC PHONEME DICTIONARY FOR SPEECH RECOGNITION

(75) Inventor: Peter Kleinschmidt, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/155,858

(22) PCT Filed: Apr. 1, 1997

(86) PCT No.: PCT/DE97/00657

§ 371 (c)(1),
(2), (4) Date: Mar. 22, 1999

(87) PCT Pub. No.: WO97/37311

PCT Pub. Date: Oct. 9, 1997

(30) Foreign Application Priority Data

Apr. 2, 1996 (DE) .......................... 196 13 266

(51) Int. Cl.[7] .............................................. G10L 15/06
(52) U.S. Cl. ....................................... 704/243; 704/249
(58) Field of Search ................................ 704/249, 251, 704/254, 243–245

(56) References Cited

U.S. PATENT DOCUMENTS

| 5,212,730 | A | * | 5/1993 | Wheatley et al. | ........... 704/243 |
| 5,329,608 | A | * | 7/1994 | Bocchieri et al. | ........... 704/243 |
| 5,355,433 | A | * | 10/1994 | Yasuda et al. | ............... 704/243 |
| 5,632,002 | A | * | 5/1997 | Hashimoto et al. | ......... 704/231 |
| 5,839,107 | A | * | 11/1998 | Gupta et al. | ................ 704/243 |
| 5,903,867 | A | * | 5/1999 | Watari et al. | ................ 704/270 |
| 5,987,414 | A | * | 11/1999 | Sabourin et al. | ............ 704/245 |

FOREIGN PATENT DOCUMENTS

| DE | 195 16 664 C1 | 8/1996 |
| DE | 196 10 848 A1 | 9/1997 |
| EP | 0 602 296 A1 | 6/1994 |
| EP | 0 661 688 A2 | 7/1995 |

OTHER PUBLICATIONS

K. Wothke, "Morphologically Based Automatic Phonetic Transcription", IBM Systems Journal, vol. 32, No. 3, 1993, pp. 486–511.
S. Besling, "Heuristical and Statistical Methods for Grapheme–to–Phoneme Conversion", Proceedings KONVENS 1994, Austria, pp. 23–31.
K. Bauer et al., Expertensysteme: Einführung in Technik und Anwendung, Siemens AG, pp. 27–82.
van den Bosch et al., "Data–Oriented Methods for Grapheme–to–Phoneme Conversion", 1993, pp. 45–53.

* cited by examiner

*Primary Examiner*—David D. Knepper
(74) *Attorney, Agent, or Firm*—Staas & Halsey LLP

(57) ABSTRACT

A phoneme dictionary for speech recognition has a continuously stored set of standard words and their phonemes. As documents are needed by an application using the phoneme dictionary, words in the documents are selected and dynamically and temporarily added to the phoneme dictionary. Phonemes corresponding to the added words are generated using a text-to-phoneme converter, and are then temporarily added to the dictionary. Temporarily added words and their phonemes are dropped from the phoneme dictionary when their document is no longer needed by the application.

17 Claims, 8 Drawing Sheets

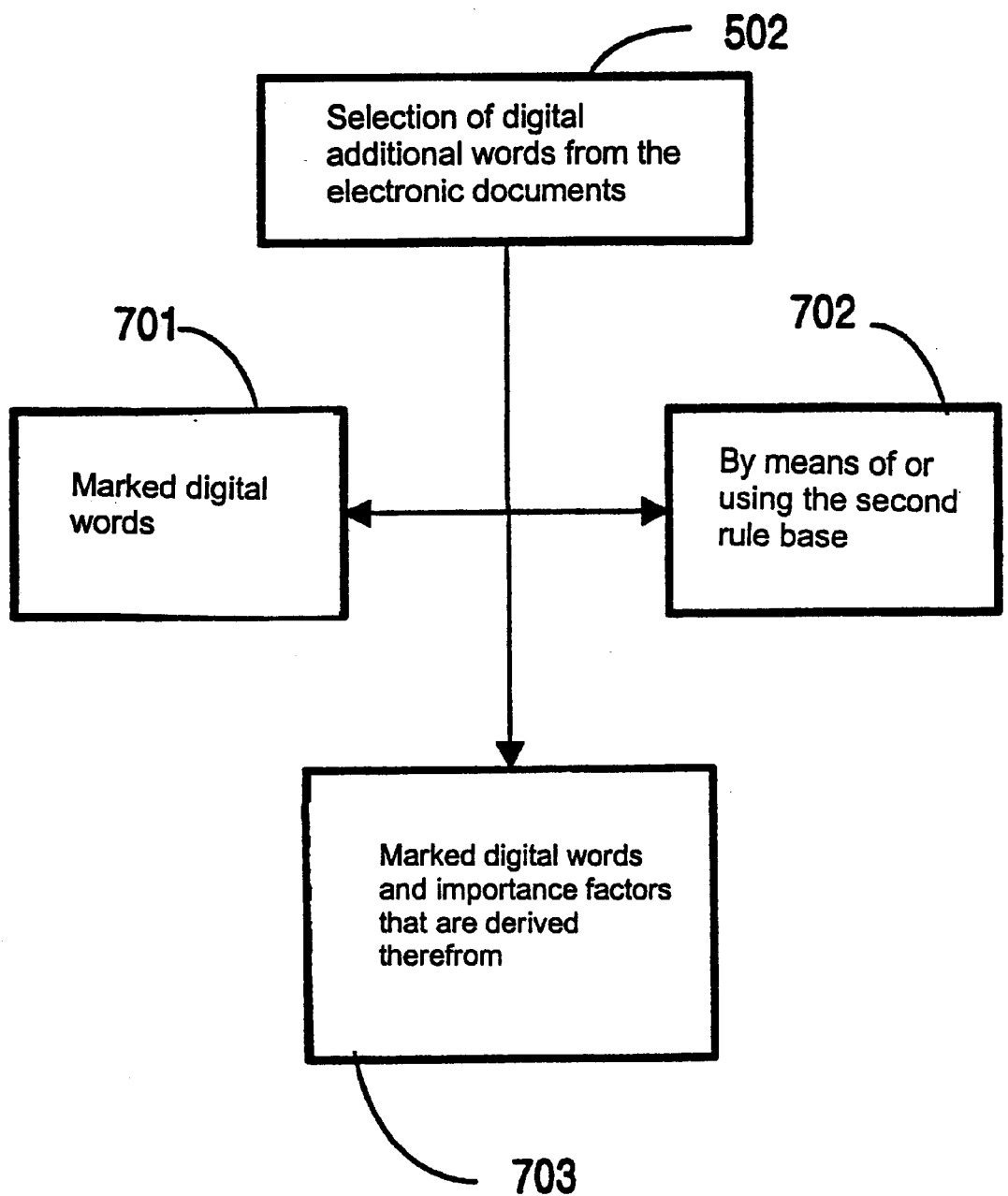

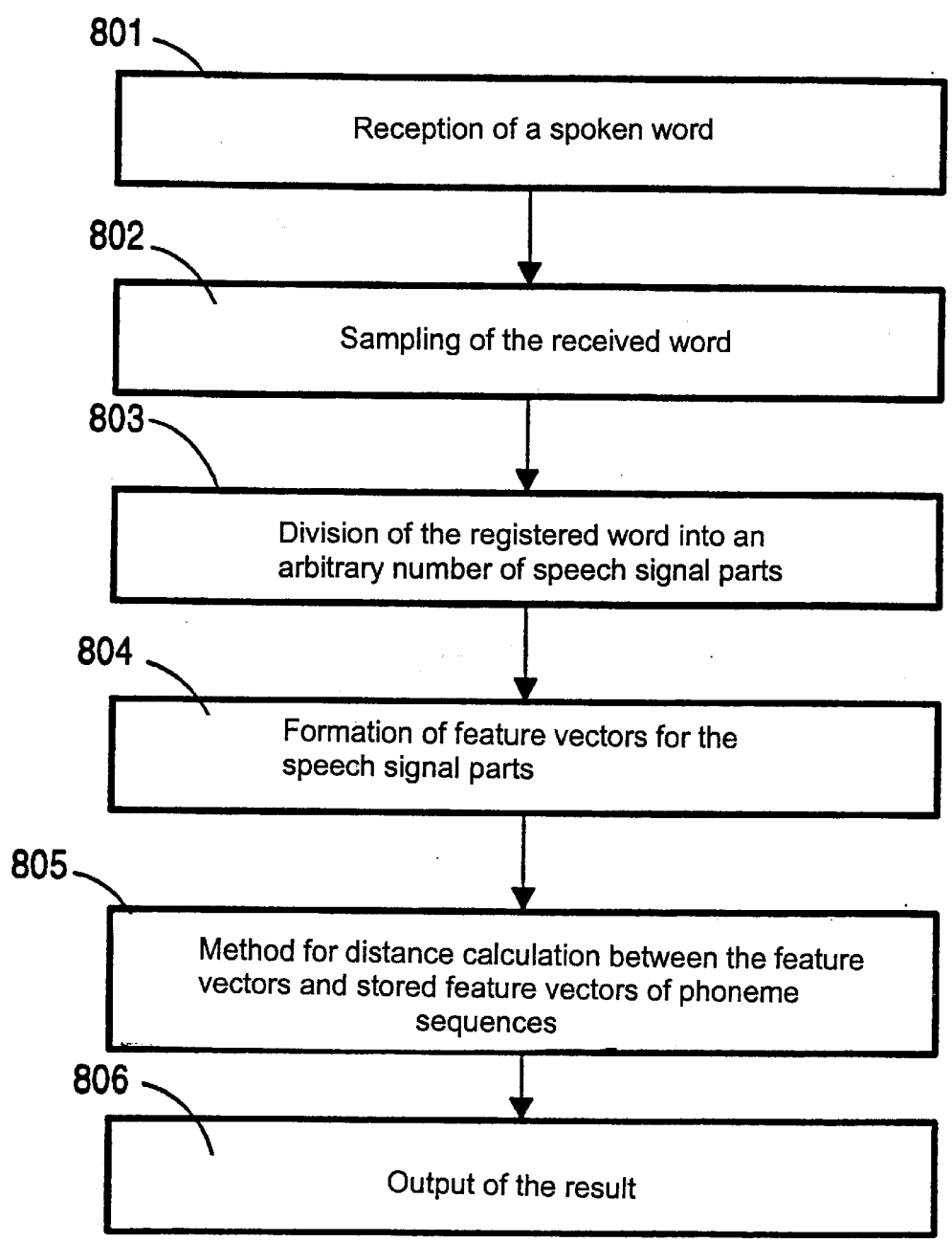

DYNAMIC PHONEME DICTIONARY FOR SPEECH RECOGNITION

BACKGROUND OF THE INVENTION

1. Field of the Invention

The present invention relates generally to speech recognition and in particular to providing a dictionary for a speech recognition system.

2. Description of the Related Art

A considerable problem in computer-assisted speech recognition is comprised in the size of the stored vocabulary. Since computer-assisted speech recognition is implemented by comparing sequences of feature vectors that respectively represent a word in a feature space, speech recognition becomes more and more inexact with the size of a plurality of words to be compared. The cause of the increasing imprecision of the speech recognition given an increasing plurality of words to be compared lies in the higher plurality of sequences of feature vectors in the feature space. As a result of the increased plurality of feature vectors, the distances of the feature vectors from one another in the feature space become smaller and, thus, a classification of the word to be recognized also becomes more and more problematical.

The necessity of reducing the vocabulary thus derives. A problem in the reduction of the vocabulary, however, is comprised therein that those words that are not stored with the corresponding sequences of feature vectors are also not recognized.

Further, the considerable memory requirement is to be considered a disadvantage of storing a large vocabulary. This high requirement for memory space leads to considerable costs that are unavoidable given employment of a large vocabulary that is not adapted to the application.

The structure of a text phoneme-converter is known, for example, from publications K. Wothke, Morphologically Based Automatic Phonetic Transcription, IBM Systems Journal, Vol. 32, No. 3, pp. 486–511, 1993; S. Besling, Heuristical and Statistical Methods for Grapheme-to-Phoneme Conversion, Proceedings CONVENS 1994, Vienna, AUstria, pp. 23–31, 1994; and W. Daelemens et al., Data-oriented Methods for Grapheme-to-Phoneme Conversion, Proceedings EACL 1993, Utrecht, pp. 45–53, 1993.

A survey of the fundamentals of expert systems is described in the publication by K. Bauer et al. Expertensysteme: Einführung in Technik und Anwendung, Siemens A G, Engioneering & Kommunikation, D. Nebendahl (Ed.), Siemens A G (Publishing Department), ISBN 3-8009-1495-6, pp. 27–82, 1987.

SUMMARY OF THE INVENTION

The invention is based on the problem of specifying an arrangement for producing a digital dictionary with which a flexible, favorable and qualitatively high-grade speech recognition can be realized on the basis of the digital dictionary. Another problem is to specify an arrangement for speech recognition upon employment of the digital dictionary. The invention is also based on the problem of specifying a method for producing a digital dictionary with the assistance of a computer that enables a flexible, favorable and qualitatively high-grade speech recognition on the basis of the digital dictionary.

The first described arrangement comprises a means for reading arbitrary electronic documents in, as well as a first memory for permanent storage of standard words and their phoneme sequences and a second memory for temporary storage of additional words and their phoneme sequences as well as a text-phoneme converter. As a result of the means for selecting and reading in arbitrary electronic documents, those documents that contain a suitable vocabulary for a prescribable application situation are automatically selected and read in from an arbitrary set of electronic documents on the basis of the greatest variety of criteria. Added words for which the corresponding phoneme sequences are formed with the text-phoneme converter are selected from the words. The added words and the corresponding phonemes are temporarily stored in the second memory. At least the standard words and the added words and their respective phoneme sequences form the digital dictionary.

This arrangement makes it possible to respectively determine an application-specific vocabulary for the duration of a specific, characteristic application and to temporarily store these words together with the corresponding phoneme sequences and temporarily incorporate them in the digital dictionary. When the application changes, new electronic documents are again identified and added words are again selected from them, these then being again temporarily stored in the second memory with the corresponding phoneme sequences. The inventive arrangement thus achieves a considerable reduction of the memory space required.

Compared to the first described arrangement, the second disclosed arrangement additionally comprises a means for speaker-dependent speech recognition. By reducing the respectively investigated (compared) vocabulary in the speech recognition, it thereby becomes possible to achieve a better recognition performance than is possible with the known arrangements, since the plurality of words to be compared has been reduced without, however, leaving specific words characteristic of the application out of consideration. Further, the inventive arrangement can be very flexibly utilized under the greatest variety of application situations without requiring involved training phases of the vocabulary for each characteristic application situation. As a result thereof, a substantially lower requirement of memory space is achieved, this leading to a considerable saving of costs for the arrangement for speech recognition.

In the method according to patent claim 6, a digital dictionary that already comprises standard words and phoneme sequences allocated to the standard words at the beginning of the method is built up with the assistance of a computer. Electronic documents are identified in a first step and added words are selected from the electronic documents. A respective phoneme sequence that is allocated to the respective added word is formed for the added words with the assistance of the text-phoneme converter. The added words are temporarily stored and temporarily assigned to the digital dictionary. As a result of the inventive method, a digital dictionary is built up in a way that can be very flexibly adapted to changing applications. A speech recognition that uses the dictionary which has been built up according to the present invention is thus implemented rapidly and reliably with low costs since, first, the plurality of permanently stored words is reduced and, second, the density of the individual phoneme sequences in the feature space is likewise reduced, this leading to improved recognition performance in the speech recognition.

Advantageous developments of the inventive arrangements as well as advantageous developments of the inventive method are provided by a decision unit that is additionally provided for the selection of the added words from the selected electronic documents. A third memory may be provided for storing predetermined reserve words and phoneme sequences allocated to the reserve words that are temporarily stored for each application, whereby the phoneme sequences of the reserve words exhibit a higher quality than the phoneme sequences that are formed by the text-phoneme converter. In one embodiment, a fourth memory for storing speech feature vectors of sayings and/or words that are prescribed by a user, whereby the speech feature vectors respectively characterize a part of the word. User feature vectors of a part of a digitalized voice signal that characterize the part of the digitalized voice signal are compared to stored phoneme feature vectors and/or to stored speech feature vectors, whereby the phoneme feature vectors respectively characterize the phoneme, and whereby the speech feature vectors respectively characterize a part of the word. As a preferred development, the determination of the electronic documents ensues according to at least one of the following rules: an unambiguous allocation of the electronic documents is predetermined; spoken words of a user are recognized by the arrangement for speech recognition and the determination ensues on the basis of the recognized words and on the basis of a predetermined, first rule base; spoken words of a user are recognized by the arrangement for speech recognition and the determination ensues on the basis of the recognized words and on the basis of a predetermined, first rule base in an interactive dialogue between the arrangement for speech recognition and the user. Information characterizing the document type is stored for each document type of the electronic documents, and the electronic documents are determined on the basis of the information. The selection of the added words from the electronic documents ensues according to at least one of the following procedures: those words from the electronic documents that are marked in at least one prescribable way in the electronic documents are selected from the electronic documents as added words; the selection ensues on the basis of a predetermined, second rule base; those words from the electronic documents are selected as added words that are marked in at least one prescribable way in the electronic documents and that exhibit an importance factor derived from the marking that is greater than prescribable importance factors of other words; those words from the electronic documents that are marked in at least one prescribable way in the electronic documents are selected from the electronic documents as added words. Thus, the markings that are employed for the selection of the added words are determined from a particular document type of the respective electronic document. The method according to the present invention preferably has predetermined reserve words and phoneme sequences allocated to the reserve words which are temporarily stored in every application dependent on the application and are assigned to the dictionary, allowing the phoneme sequences of the reserve words to exhibit a higher quality than the phoneme sequences that are formed by the text-phoneme converter. In one embodiment, a digitalized voice signal spoken by a user is divided into an arbitrary plurality of digital voice signal parts. The following steps are implemented for each voice signal part for a prescribable set of voice signal parts: a user feature vector that characterizes the voice signal part is determined for the voice signal part; a respective similarity value of the user feature vector with the respective phoneme feature vector is determined from a comparison of the user feature vector to at least an arbitrary plurality of phoneme feature vectors that respectively characterize a stored phoneme; the similarity values are stored; a sequence of phonemes for the, digitalized voice signal with which the digitalized, voice signal is described is determined on the basis of the similarity values; and the digitalized voice signal and the sequence of phonemes allocated to the digitalized voice signal are stored in a fourth memory. According to the present invention, speaker-independent speech recognition using a digital dictionary constructed according to the foregoing is provided. In particular, a digitalized voice signal spoken by a user is divided into sets of digital voice signal parts; a sequence of feature vectors with which the digitalized voice signal is characterized is formed from the digitalized voice signal parts; a sequence of phonemes that is most similar to the sequence of feature vectors With respect to a similarity criterion is determined on the basis of the feature vectors in the feature space; and a recognized word derives from the sequence of phonemes.

In a development of the inventive arrangement, it is advantageous to provide a decision unit WE with which a selection of the added words from the electronic documents is implemented. The selection can ensue in the greatest variety of ways. A further flexibility in the use of the arrangement for speech recognition is thus achieved by this development. A further reduction of the requirement for memory space is also achieved by this development since, due to an intentional selection of the added words from the words of the electronic documents, not all words but only those that are in fact of great significance with respect to the respective application situation need be temporarily stored.

Further, it is advantageous in a development of the arrangement to provide a third memory in which reserve words and their phoneme sequences are temporarily stored, whereby the phoneme sequences exhibit a higher quality than the phoneme sequences that are formed by the text-phoneme converter. As a result of this development, the quality of the "phoneme prototypes" is enhanced, as a result whereof the results of the speech recognition are clearly improved.

It is also advantageous to provide an arrangement with which phoneme sequences are formed for words spoken by a user and these are likewise stored. The employment of the arrangement is thus no longer limited to only electronic documents; rather, the arrangement can, as a result of this development, also process words spoken by a user. This leads to an enhanced flexibility of the employment of the arrangement for speech recognition.

It is also advantageous in a development for the inventive method according to patent claim 6 to implement the determination, i.e. the selection, of the electronic documents according to different rules.

For example, it is thus advantageous to unambiguously allocate the electronic documents to specific applications, as a result whereof the speed of the implementation of the determination of the electronic documents is considerably increased.

A refinement and further flexibilization of the selection of the electronic documents is achieved in that spoken words of a user are recognized by the arrangement for speech recognition and the determination ensues on the basis of the recognized words as well as of a predetermined, first rule base. The actual selection of the electronic documents is thus matched considerably better to the application, and, thus, added words are selected that correspond very well to the respective application.

It is also advantageous to determine the selection with reference to the rule base in an interactive dialogue between the arrangement and the user in order to thus achieve a further refinement of the selection. A very simple development of the inventive method can also be seen therein that the selection ensues on the basis of document types of the electronic documents.

It is also advantageous to implement the selection of the added words from the electronic documents in a way that words marked in a specific way are automatically selected as added words. The selection of the added words is thus substantially accelerated. It is also advantageous to make the selection of the added words on the basis of a predetermined, second rule base. The selection of the added words is thereby considerably refined without noticeably reducing the added words with substantial significance with respect to the speech recognition process in the respective application.

It is also advantageous to derive an importance factor for the individual markings in the electronic documents in order to indirectly select only those marked words therefrom that are in fact of significance. This leads to a further reduction of the memory requirement since a lower number of added words is stored. The recognition performance of the speech recognition that uses the digital dictionary is also enhanced further since only a lower plurality of added words need be compared to one another. The density of the feature space is thus reduced further.

It is also advantageous to determine markings on the basis of the document types of the respective electronic document, these markings being used for the selection of the added words.

The quality of the "prototypes" of the phoneme sequences is enhanced in that predetermined reserve words with corresponding phoneme sequences are taken into consideration. The phoneme sequences of the reserve words have a higher quality than the phoneme sequences that are formed by the text phoneme converter, as a result whereof an enhancement of the speech recognition implemented later upon employment of the digital dictionary is achieved.

So that it is also possible to consider words that are spoken by a user, it is advantageous in a development of the method to identify and store a phoneme sequence for the respectively spoken voice signal.

BRIEF DESCRIPTION OF THE DRAWINGS

An exemplary embodiment is shown in the Figures and is explained in greater detail below.

Shown are:

FIG. 7 a block diagram in which various alternatives for the selection of the added words from the electronic documents are shown;

FIG. 8 a flowchart that shows a method for speech recognition upon employment of a digital dictionary that was produced in the inventive way.

DETAILED DESCRIPTION OF THE PREFERRED EMBODIMENTS

Figure 1:
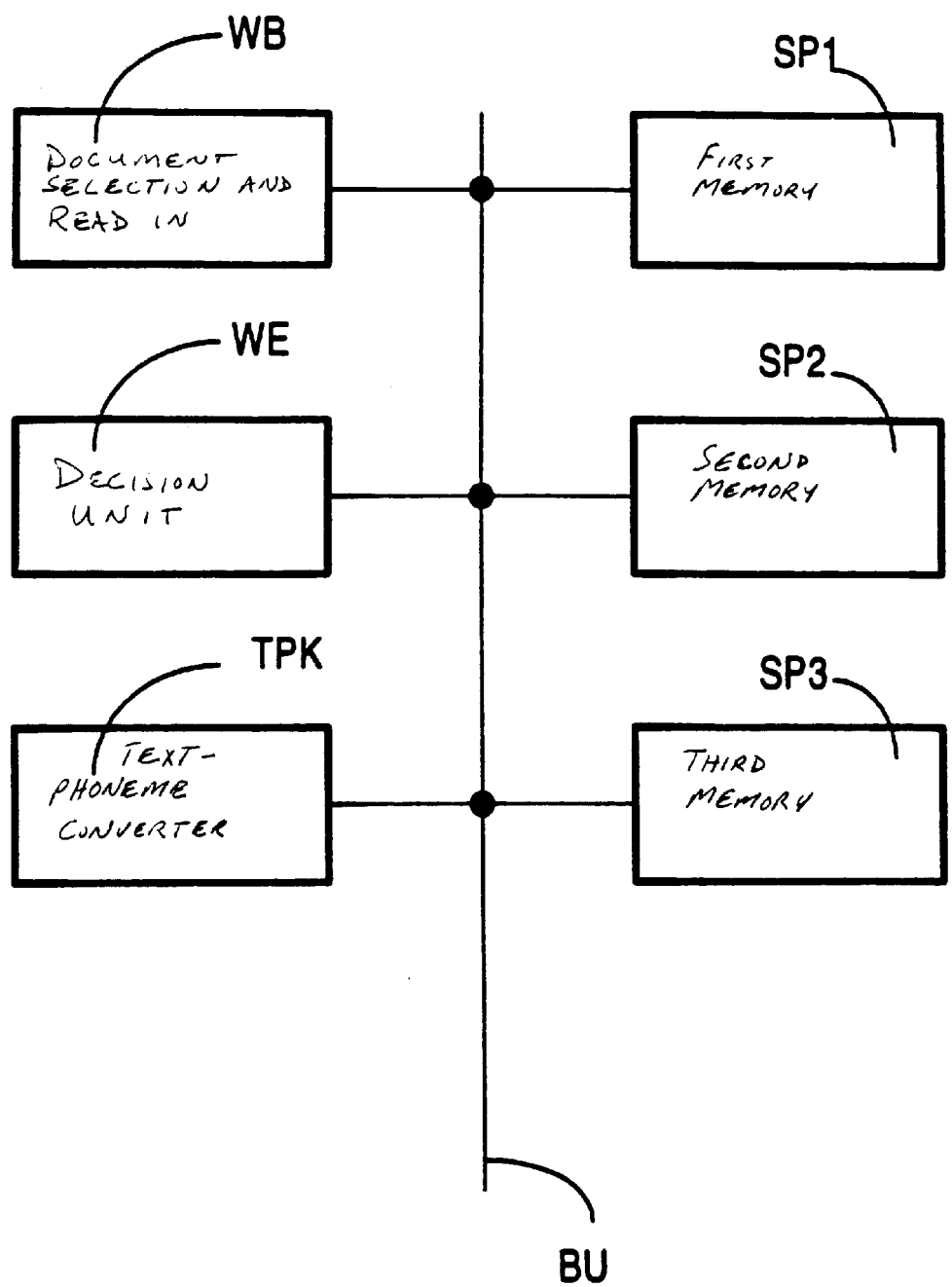
FIG. 1 the inventive arrangement for producing a digital dictionary with some developments, in the form of a block diagram.

FIG. 1 shows the arrangement for producing a digital dictionary.

The arrangement for producing a digital dictionary comprises at least the following components:

a first means WB for the selection and read-in of electronic documents;

a text-phoneme converter TPK;

a first memory SP1 for the permanent storage of standard words and of phoneme sequences that are respectively allocated to the standard words; as well as a second memory SP2 for the temporary storage of added words that are stored by the first means WB for the selection and read-in of the electronic documents as well as of the phoneme sequences that are formed in the text-phoneme converter TPK for added words selected from the words of the electronic documents.

The arrangement for speech recognition comprises the same components as the arrangement for the production of a digital dictionary. In addition, a second means HMM for speaker-independent speech recognition is provided in the arrangement for speech recognition (see FIG. 2).

The individual components are respectively coupled to one another via a bus BU.

The individual components of the arrangements are explained in greater detail in conjunction with the method.

The structure of the text-phoneme converter TPK is known, for example, from publication by K. Wothke, Morphologically Based Automatic Phonetic Transcription, IBM Systems Journal, Vol. 32, No. 3, pp. 486–511, 1993.

Figure 3:
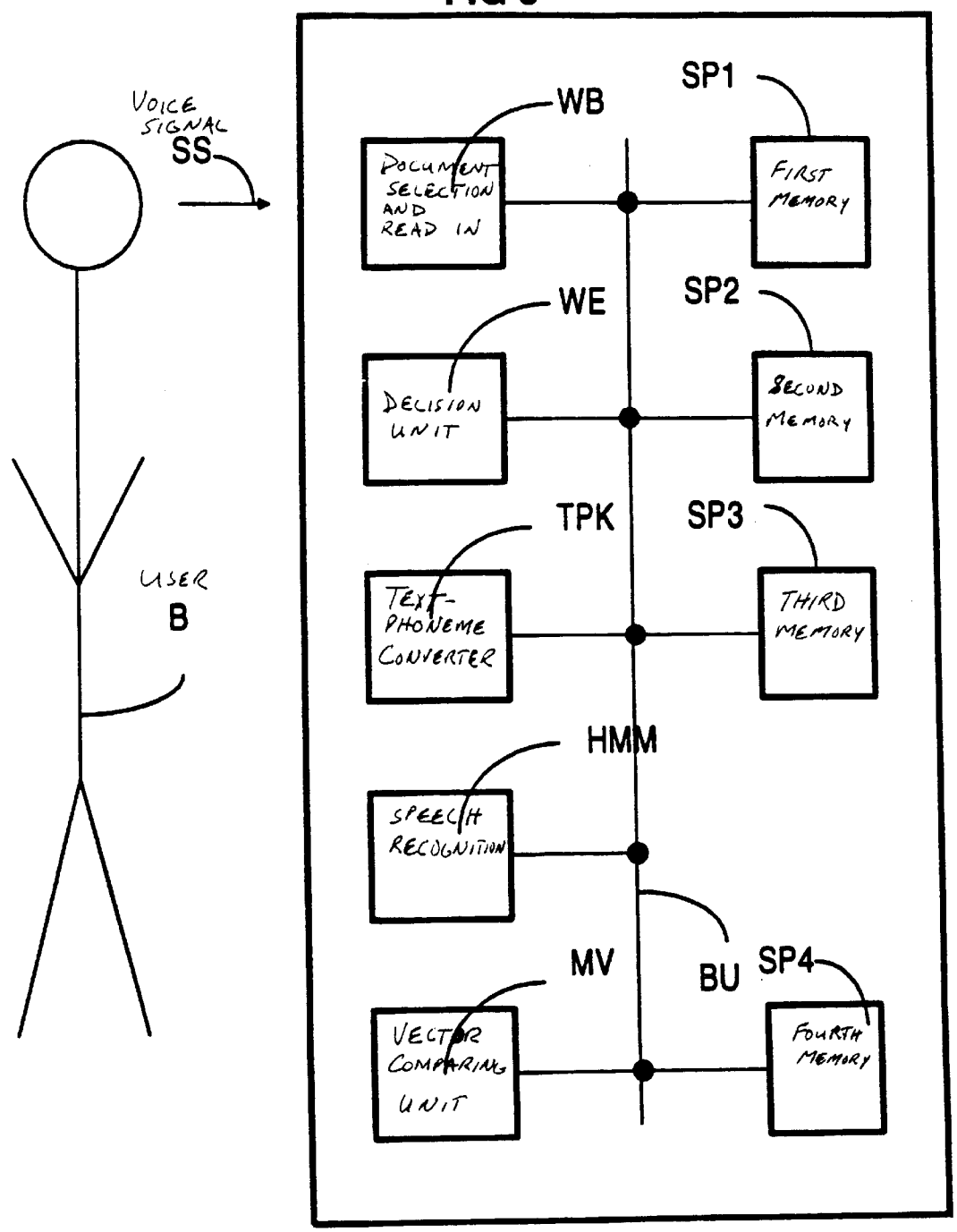
FIG. 3 a development of the inventive arrangement for speech recognition with a means for comparing a spoken voice signal to stored phoneme feature vectors.

FIG. 3 shows a development of the arrangement for speech recognition wherein words spoken by a user B in the form of a voice signal SS are digitalized by the arrangement for speech recognition. In a third means MV for comparing phoneme feature vectors, a sequence of phonemes is formed for the respective voice signal SS, this sequence of phonemes being then stored in a fourth memory SP4 (explained later) together with the digital voice signal SS.

Figure 4:
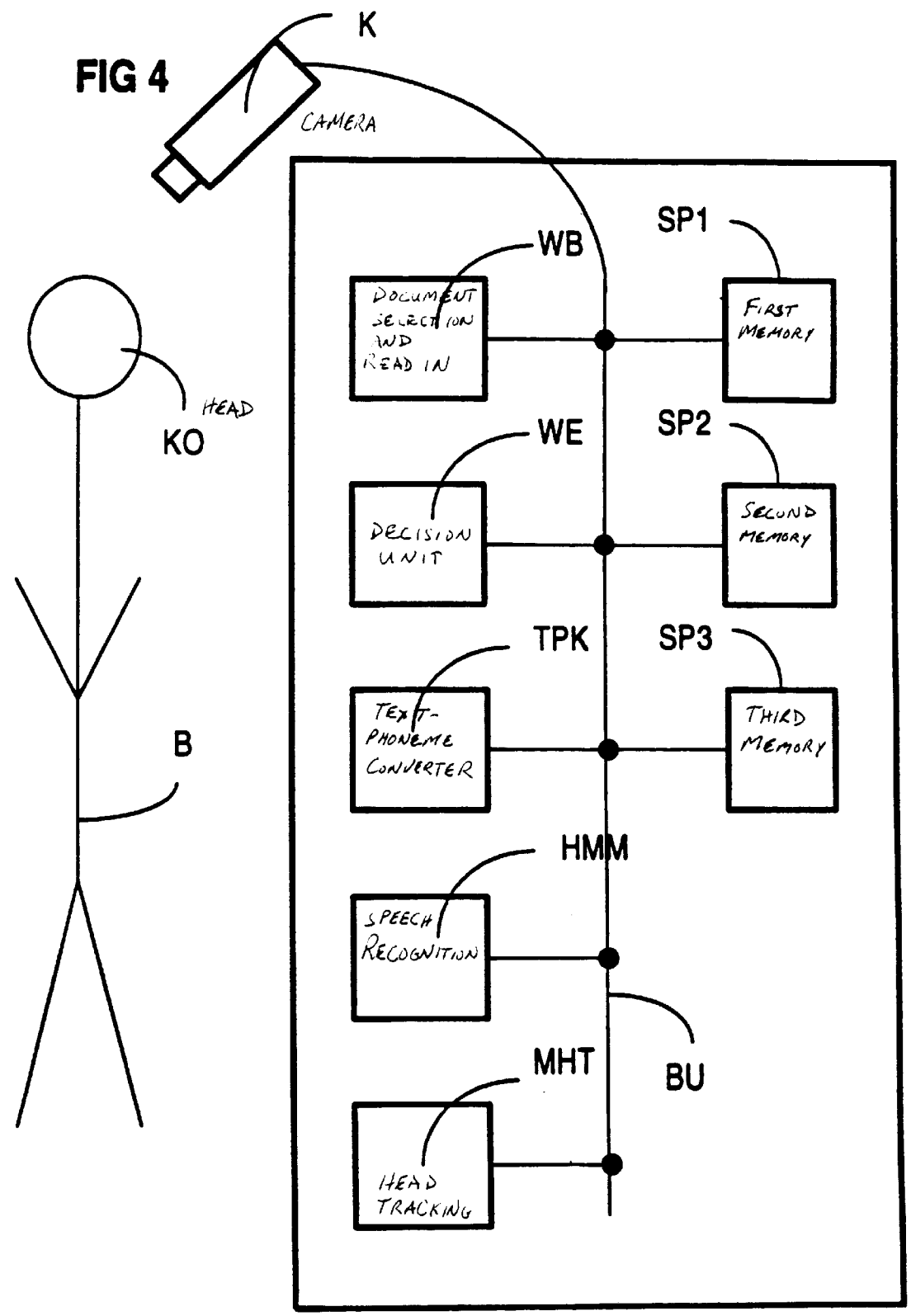
FIG. 4 a sketch that shows a development of the inventive arrangement by a head tracking system.

FIG. 4 shows a head tracking system with a camera K. The camera K takes a sequence of pictures of a target object, for example the head KO of a user B, and supplies the corresponding image signals to the arrangement for speech recognition, in this development, further, a fourth means MHT for head tracking is provided in the arrangement for speech recognition, the design thereof to be explained in greater detail later. Let it merely be mentioned here that a selection of the electronic documents ensues with the fourth means MHT. This occurs in a way that is explained later in conjunction with the method.

Figure 5:
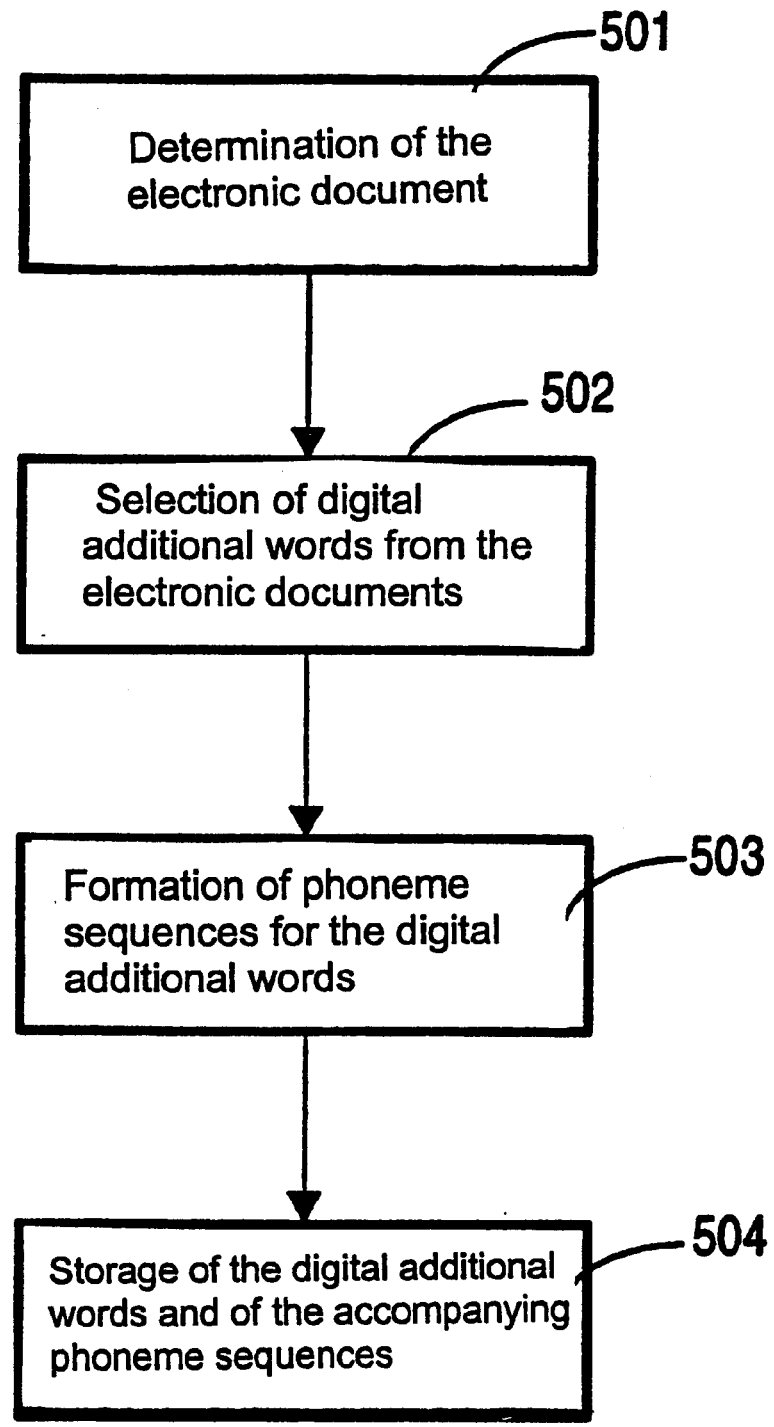
FIG. 5 a flowchart that shows the inventive method.

The inventive method is shown in individual method steps in the form of a flowchart in FIG. 5. In a first step 501, those electronic documents from a plurality of electronic documents are identified from which added words are selected in a further step 502, these contain a specific vocabulary for an application situation explained later. This application specific vocabulary in the form of the added words is supplied to the text-phoneme converter TPK in which a phoneme sequence is respectively formed for the added words. The phoneme sequences as well as the respectively added words are stored 504 in a second memory SP2.

Figure 6:
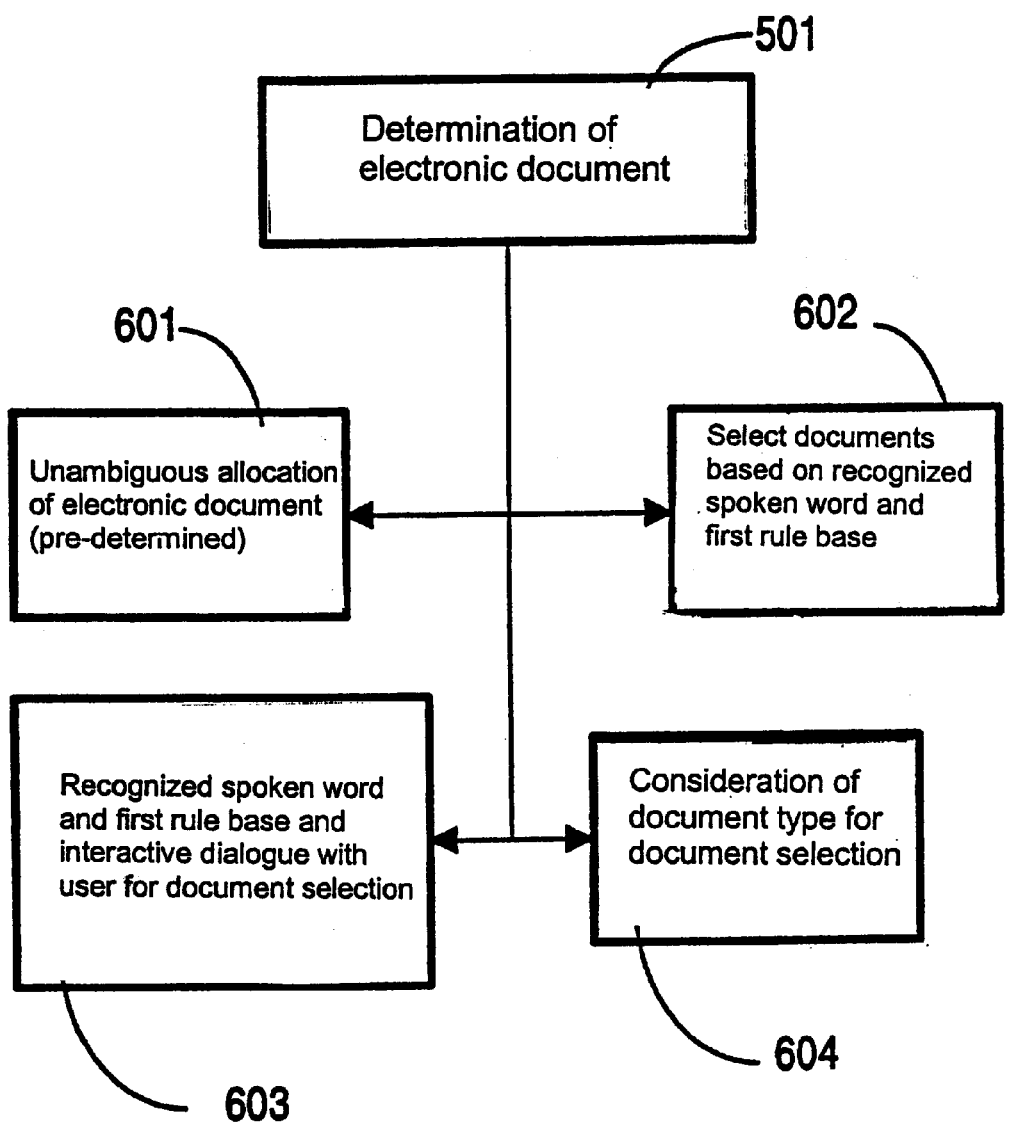
FIG. 6 a block diagram that shows various alternatives for determining the electronic document.

The most various possibilities are provided for determining the electronic documents 501, these being shown in FIG. 6. For example, the determination can ensue in at least one of the following ways:

A clear allocation of electronic documents can, for example, be prescribed 601 for a specific application situation;

It is provided in a development, further, to determine 602 the selection of the electronic documents on the basis of words that the user B had spoken into the arrangement for speech recognition and that were recognized by the arrangement, as well as on the basis of a predetermined, first rule base;

It is also provided to determine 603 the selection of the electronic documents on the basis of the recognized words as well as on the basis of the first rule base together with the user B in an interactive dialogue between the arrangement for speech recognition and the user B;

for electronic documents that respectively exhibit a prescribable document type, the electronic documents are selected 604 on the basis of the document type.

All different versions of the method are based on the inventive idea that, in addition to the standard works already stored in the first memory SP1 and the corresponding phoneme sequences for the standard words that are permanently stored therein, the vocabulary of a digital dictionary is temporarily expanded application-specific.

The arrangement for speech recognition thereby has access to a plurality of disparate electronic documents that, for example, can comprise text, image objects or speech or videos.

The problem that is solved by the arrangement as well as the method is explained on the basis of a very simple example that, however, does not limit the universality in any way whatsoever.

For example, one can imagine the arrangement for producing a digital dictionary or the arrangement for speech recognition in a situation in a vehicle in which the vehicle driver is seeking a route description. The arrangement for speech recognition surely does not usually have, for example, the names of smaller localities stored in the first memory SP1.

Such information would have the first memory SP1 become over dimensionally large. This situation is considerably aggravated when it is not only standard town names but also street names of small municipalities that can only be found on very regional city maps that one would like to process in the scope of the speech recognition. In this applied instance recited by way of example, the inventive solution is comprised therein that, for example, electronic documents that have specific information about the sought localities or, respectively, regions are selected, and the added words are then selected from these electronic documents, supplied to the text-phoneme converter TPK and then stored together with the formed phoneme sequences in the second memory SP2, preferably at least for the duration of the specific application. These stored data are temporarily incorporated into the digital dictionary.

A very flexible, application-specific digital dictionary that can "adapt" very quickly to various situations and applications is thus created. Another simple instance of an application can be seen, for example, in a telephone information wherein the arrangements are employed. For example, regionally defined telephone books that respectively comprise the greatest variety of proper names can be selected here as electronic documents and, for example, the proper names of the corresponding localities that are of interest at the current point in time, i.e. in the current application, are stored in the second memory SP2.

In one development, a third memory SP3 is provided for storing predetermined reserve words and phoneme sequences allocated to the reserve words that are temporarily stored in every application dependent on the application. The phoneme sequences of the reserve words have a higher quality than the phoneme sequences that are formed by the text-phoneme converter TPK. When an added word is stored in the second memory SP2, then a check is initially made in this development to see whether the corresponding word is already stored in the third memory SP3 as reserve word. When this is the case, then the reserve word having the qualitatively better phoneme sequence is incorporated into the digital dictionary.

Alternatives for determining the electronic documents with the first means WB for the selection and read-in of electronic documents are described below. The first means WB for the selection and read-in is fashioned in such a way that the respectively described functionality is assured.

Unambiguous Allocation of the Electronic Documents 601.

A possible development of the method as well as of the arrangement is comprised in allocating an arbitrary plurality of predetermined electronic documents to specific applications or, respectively, actions that are selected and read in by the first means WB for selecting and reading in electronic documents upon implementation of the action or, respectively, in the corresponding application. For example, these unambiguous allocations are stored in a list in a memory of the arrangement for speech recognition.

It is also advantageous to not only undertake fixed allocations but to create semantic references for fixed allocations and to select and read in the electronic documents according to the semantic references. For example, the semantic references can also be comprised in the search for synonyms of hyper links when the user B clicks on the hyper-links.

Selection of the Electronic Documents on the Basis of Recognized Spoken Words by the User B and the First Rule Base 602.

In this development of the method and of the arrangement, words spoken by the user B that are recognized by the arrangement for speech recognition are employed for the selection of the electronic documents. This occurs in that, after recognition of the spoken words, these words are used in the predetermined, first rule base with which the electronic documents are selected.

The first rule base is very application-specific. The following simple example is presented for illustrating the procedure as well as the fashioning of the first means WB for the selection and read-in of electronic documents. This simple example is only intended to present the fundamentals of the first rule base for a specific application but does not limit the universality in any way whatsoever.

For the applied situation described above wherein a vehicle driver in a vehicle requires a navigation aid for locating a destination, it can be imagined that the user B, for example, has spoken the words "map", "Germany", "regional", "Munich", among others, into the arrangement for speech recognition. These words are recognized by the arrangement for speech recognition and supplied to the first rule base. The following specific rules are prescribed in the first rule base for determining the electronic documents to be selected, a regional map of Munich in this case.

IF a recognized word equals "map"
AND
   a recognized word equals "Munich"
AND
   a recognized word equals "regional",
THEN
   select the regional map of the city of Munich.

In this case, the regional map of Munich with the corresponding vocabulary of the regional localities and, for example, the corresponding street names is selected and read in as electronic document. The added words are selected from this electronic document, are supplied to the text-phoneme converter TPK, the phoneme sequences are formed for the added words and stored in the second memory SP2.

A further applied instance can be seen, for example, in a digital personal telephone book that is provided in a standard computer with integrated arrangement for speech recognition. When, for example, the user b of the computer unit wishes to send a fax via the computer, the user B needs the telephone number of the recipient of the fax. When, for example, the user B speaks the words "fax", "information", "telephone book" and these words are recognized by the arrangement for speech recognition, then the following predetermined rules are provided, for example, in the first rule base.

IF a recognized word equals "fax"
AND
   a recognized words equals "telephone book"
THEN
   select the electronic document "personal telephone book".

A farther-reaching rule in the first rule base for refining this procedure could be seen, for example, in the following rule:
IF a recognized word equals "recipient"
AND
   a recognized word equals "name of recipient"
AND
   name of the recipient is not present in the personal telephone book
THEN
   automatically select information and determine the sought telephone number.

Selection and Read-In of the Electronic Documents on the Basis of Recognized Words, the First Rule Base and an Interactive Dialogue Between the Arrangement for Speech Recognition and the User B 603.

It is also provided in a development of the method and of the arrangement to base the selection of the electronic documents not only on the recognized rules and the first rule base but to carry this principle farther and make the selection more precise in an interactive dialogue between the arrangement for speech recognition and the user B.

For example, the following situation is to be understood her. When the user B has spoken, for example, the words "route description", "city", "Taufkirchen" and these words were recognized by the arrangement for speech recognition, it is provided in this development that, for further limitation of possible electronic documents to be selected, the user B is asked, for example, if the city to which the user B needs a route description is in Germany. When this question is answered in the affirmative, another, refining question could, for example, be that the arrangement for speech recognition directs a question to the user B as to whether the city is in north Germany or in south Germany. This procedure can be refined as desired, respectively application-specific, of course. Accordingly, the rules of the first rule base must be modified in a way familiar to a person skilled in the art.

A survey of the fundamentals of expert systems is described in the publication by K. Bauer et al. Expertensysteme: Einfühung in Technik und Anwendung, Siemens A G, Engioneering & Kommunikation, D. Nebendahl (Ed.), Siemens A G (Publishing Department), ISBN 3-8009-1495-6, pp. 27–82, 1987.

Selection Taking Document Types into Consideration 604.

In a further development of the method and of the arrangement, it is provided to employ a document type for the selection of the electronic documents. What is to be understood by document type, for example, is the particular whether the electronic document is a matter of a pure text datafile, of an image datafile, of a video datafile or of a pure voice datafile. In the applied instance of a vehicle, for example, information about electronic documents to be selected can thereby arise from received radio messages or recognized words as well. What are also to be understood by document types in this context are, for example, particulars as to whether the electronic document is a map, a digital telephone book, a hotel reservation document or, dependent on the application, a corresponding electronic document.

The development is comprised therein that, on the basis of recognized words, the arrangement for speech recognition recognizes, for example, that the application involves the search for a hotel room. The required added words should then meaningfully refer to the specific application of a hotel reservation. In this case, it is provided that those electronic documents whose document type describes, for example, a hotel reservation or a hotel in general be selected and read in.

Various possibilities for selecting added words from the selected electronic documents 502 are shown in FIG. 7.

In a first embodiment, the selection of the added words from the words of the electronic documents can ensue in a way that words or expressions marked in a predetermined way in the electronic documents are automatically selected 701 as added words.

For example, an example of such a marking is to be seen in the hypertext navigation language HTML wherein, for example, headings are marked by corresponding, unambiguous start and end sequences. A similar principle can be employed for the general marking of words. Another example of such a marking is to be seen in the text processing language LATEX, wherein individual words are likewise marked by unambiguous start control sequences and end control sequences.

It is provided in another development to undertake the selection 702 of the added words on the basis of a second rule base.

The rules of the second rule base are again very application-specific. For this reason, only a very rough principle of possible rules of the second rule base shall likewise be presented here.

For example, it is conceivable that, when the application mainly refers to objects, whereby nouns will thus be frequently employed, and, for this reason, a rule of the second rule base can, for example, be comprised therein in this case that:
IF the application has mainly objective reference,
THEN select nouns as added words from the words of the electronic documents.

By contrast thereto, is can be meaningful to select verbs as added words in, for example, an application that refers mainly to activities. A possible rule of the second rule base would then, for example, have the following basic structure:
IF the application mainly describes activities,
THEN select verbs as added words from the electronic documents.

A further possibility can be comprised therein that those words that are not stored as standard words are selected from the electronic documents as added words. In this case, a possible rule of the second rule base has the following basic structure:
IF a term occurs in the electronic document and the term is not stored as standard word,
THEN select the term as added word.

A refinement of the embodiment of selecting marked words as added words is to be seen therein that importance factors with reference whereto the selection of the added words is made are determined 703 for individual markings of the words. For example, it can be taken into consideration in the determination of the importance factors that the hierarchy of headings of various levels, for example, respectively hierarchically enter into the importance factors in an application. For example, it can thereby also be taken into consideration that words "printed bold face" are more important than words "printed in italics" but the latter are more important than unmarked words.

Figure 2:
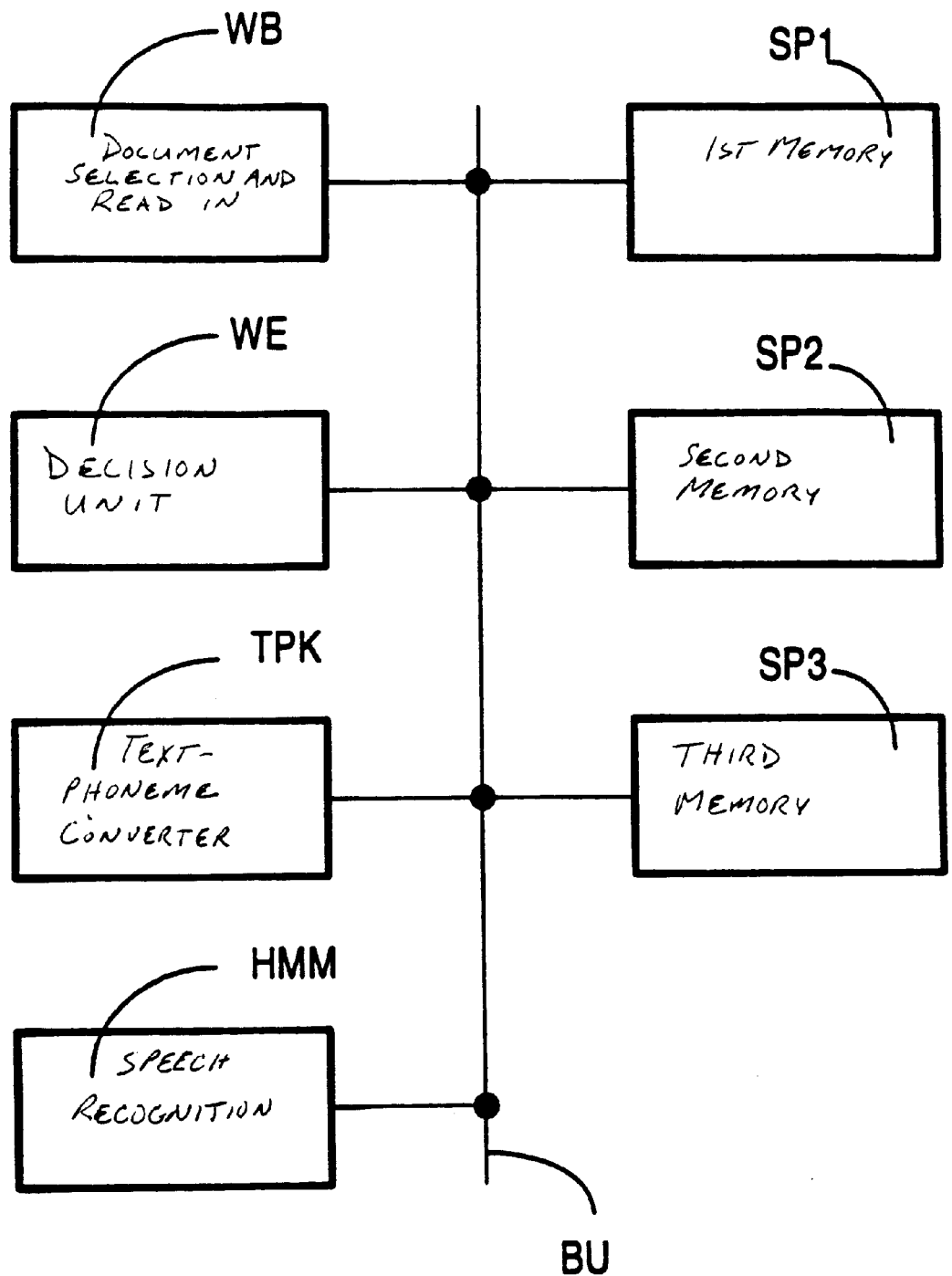
FIG. 2 the inventive arrangement for speech recognition with some developments, in the form of a block diagram.

A further development of the method and of the arrangements is shown in FIG. 2.

In addition to the second means HMM for speaker-independent speech recognition, at least one fourth memory SP4 for storing phoneme feature vectors, the means MV for comparing user feature vectors of a part of the digitalized voice signal SS that characterize the part of the digitalized voice signal SS to stored phoneme feature vectors are provided in the arrangement for speech recognition. As a result of the imaging of digitalized voice signals that are spoken by a user onto feature vectors of phonemes that are already stored, it is possible to employ only the solution of the speaker-independent speech recognition.

In the development of the method, the digitalized voice signal SS newly spoken by the user B is divided into an arbitrary plurality of voice signal parts. A respective feature vector is then determined for a prescribable plurality of voice signal parts, this feature vector being then compared to the stored phoneme feature vectors. A respective similarity value that indicates the similarity of the respective voice signal part to the respectively compared phoneme feature vector is then determined from the comparison. The similarity values are respectively stored, and, in a last step, a sequence of phonemes for the digitalized voice signal is determined on the basis of the similarity values. The digitalized voice signal SS is described by this sequence and is stored in the fourth memory SP4 in a phoneme representation. Details of this development can be found in publication by L. De Vos, Rechnereinheit zur Spracherkennung und Verfahren zur rechnergestützen Abbildung eines digitalsierten Sprachsignals auf Phoneme, Serial Number P 19610848.9.

This procedure makes it possible to apply a speaker-independent algorithm to new, actually speaker-dependent words with a reduced requirement for memory space. The advantages of this development are to be particularly seen in the advantages of the realization of the most cost-beneficial arrangement for speech recognition that is thereby possible.

A further embodiment of the method wherein a head tracking system with a camera K is provided is shown in FIG. 3.

In a first step, what should be classified as a predetermined color for constructing a color table is determined in an interactive way together with the user B. To that end, the user marks an image region exhibiting the predetermined color in an image registered by a camera K. This can preferably occur in that, for example in the classification of skin color, the user B himself is photographed in the registered image, for example the hand or the head of the user B. The hand or, respectively, the head of the user B on the image is then marked by the user B as image region that exhibits the predetermined color. The registered image is stored in an arrangement and made available for further processing.

Other procedures are also possible here; for example, the color of a piece of clothing can also be indicated as predetermined color in that the user B marks, for example, an image region in the registered image that covers the piece of clothing having the predetermined color.

The marking can ensue in various ways; it can preferably ensue, for example, by employing a computer mouse, the keyboard or with all other possibilities known to a person skilled in the art for marking image regions to be processed in a computer unit.

The size of the marked image region is freely selectable by the user.

The color information of all colors displayable by the arrangement from the color space employed, usually the three-dimensional R-G-B (red green-blue) space, is transformed by a transformation into a two-dimensional color space. No color information whatsoever is lost due to the transformation.

The transformation can ensue in various ways. The following transformation equations are preferably provided.

A possible transformation has the following structure:

$$a = \frac{R}{R+G+B} \quad (1)$$

$$b = \frac{G}{R+G+B} \quad (2)$$

Thereby denoting are:
R the proportion of the color red in the respective color,
G the proportion of the color green in the respective color,
B the proportion of the color blue in the respective color,
a a first spatial coordinate in the two-dimensional color space, and
b a second spacial coordinate in the two-dimensional color space.

Further transformations are known to the person skilled in the art and can be utilized in the method without limitation.

As a result of the transformation, a point in the two-dimensional color space is unambiguously allocated to every point in the three-dimensional color space.

A first average color value that represents an average value of all colors occurring in the marked image region is calculated for the image region described above that is marked by the user. Since a color is represented by a numerical value in a computer unit, the calculation can ensue, for example, by forming a sum over all color values of every picture element located in the marked image region and subsequent division by the number of picture elements located in the marked image region. The result is then the numerical value representing the first average color value. The first average color value is likewise represented by a point in the two-dimensional color space.

A second average color value in the marked image region is then calculated in the same, above-described way, whereby a portion of n% of the picture elements located in the marked image region is left out of consideration in the calculation of the second average color value. The portion of n% of the unconsidered picture elements are the picture elements that are at the greatest distance from the first average color value in the two-dimensional color space, i.e. respectively exhibit a color that differs most from the first average color value.

This non-consideration of color values serves the purpose of error compensation. This procedure is very advantageous in order to compensate color irregularities such as, for example, the eyes of the user that are also located in the marked image region in, for example, the calculation of a second average color value representing the skin color on the basis of a marked image region that is represented by the head of the user.

The size of n, i.e. the particular as to how many % of the color values located in the marked image region should remain out of consideration, is dependent both on the subject with reference whereto the second average color value is to be formed as well as on the required precision of the second average color value and on the available computer capacity. For this reason, the size n must be respectively adapted to the corresponding situation. The size of n can preferably lie in as range of 5–50. The method is not limited to the second average color value. A plurality of average color values can be formed with the same procedure upon employment of different values for n. A higher number of average color values enhances the quality of the classification that ensues later. Without limitation on the universality, only the second average color value shall be considered below.

Subsequently, an arbitrary plurality of negative color values is selected. What are to be understood by negative color values in this context are color values that do not correspond to the predetermined color. Preferably, at least a white point representing the color white in the two-dimensional space is employed as negative color value. A higher number of negative color values improves the classification (described below) of all colors into a color that belongs to the predetermined color, i.e. as adequately similar, and into a color not similar to the predetermined color.

A round, for example circular or elliptical, region is formed both around the second average color value as well as around each negative color point representing the respective negative color value, for example around the white point. These regions are referred to below as an average value region for the second average color value and as negative color regions for the regions around the negative color points.

The regions can comprise an arbitrary size; it is thus also possible that the regions overlap or that one region completely embraces another region.

A classification is implemented for each color value displayable by the computer, transformed into the two-dimensional color space and represented by the respective color point as to whether the respective color point is classified as adequately similar to the predetermined color point that represents the second average color value or whether the respective color point is classified as not similar to the predetermined color point.

The classification is implemented in such a way that a perpendicular for each color point displayable by the computer is placed onto each connecting line of the predetermined color point representing the second average color value with the negative color point. As a result thereof, just as many perpendicular nadirs what is to be understood by this is the intersection of the respective perpendicular with the corresponding connecting line as negative color points arise.

A first distance from the nadir point to the predetermined color point representing the second average color value is calculated for every nadir point. The first distance is compared to a second distance that represents the distance of the corresponding nadir point from the respective negative color point.

A color point is classified as sufficiently similar to the predetermined color point representing the second average color value when the first distance for each nadir point of the color point is less than the second distance and each nadir point lies in the average value region.

The binary result is stored in the color table that, after the end of the above-described method, contains a binary entry for every color point in the two-dimensional color space, i.e. for each color displayable with the computer.

For every color value that respectively unambiguously addresses an entry in the color table, the color table contains the binary information as to whether the color point was classified as similar to the predetermined color or not.

The construction of the color table according to the above-described method enables a real-time realization of various employments of the color table since only one binary value need be read out for a color value for it to be known whether the color value was classified as sufficiently similar to the predetermined color.

After the color table has been formed, an arbitrary, known algorithm for edge tracking is implemented for the entire image registered by the camera K. With the assistance of this method, subject and their subject edges are identified in the image whose color, for example according to the color table, were [sic] classified as similar to the predetermined color.

After the method has been applied to the image, a plurality of subjects that come into consideration as target subject may possibly be present on the image.

The target subject is now determined from this plurality of subjects on the basis of known characteristics of the target subject. The characteristics can be represented, for example, by the size of the target subject or the shape of the target subject.

Dependent on the intended employment of the method, the geometrical moment of the target subject can, for example, also be calculated.

Subsequently, a rectangle bounding the target subject is determined for the target subject. All subjects that exhibit the predetermined color and that are located outside the bounding rectangle are classified as belonging to the background image.

The method can be improved in that a background image that records the same scene as later when the target subject is present in the scene is registered by the camera at the beginning of the method. The target subject is not present in the background image.

In this case, the method is improved in such a way that, in the classification of a subject as the target subject, the subject is only classified as target subject when the subject is also not located on the background image.

When the target subject is represented by a head, the result of the method is, for example, the position of the head within the image.

When the target subject is represented by a hand, the result of the method is, for example, the position of the hand within the image, the distance of the hand from the camera that registers the image or the position of the individual fingers of the hand that, for example, represent specific hand gestures.

As a result of the further-processing of only the bounding rectangle for which, for example, a motion estimation is later implemented in order to determine the position of the bounded hand and, thus, of the target subject in a following frame, the required computing outlay is considerably reduced compared to known methods.

Details about a head tracking system can be found, for example, in publication by C. Maggioni, Verfahren zum Aufbau eine Farbtabelle in einer Computereinheit zur Klassifikation von Bildpunkten in einem Bild, Serial Number P 19516664.7.

The result of the above-described method is a recognized target subject. On the basis of the destination subject, for example on the basis of hand gestures or a direction in which the head KO of the user B looks, the determination of the electronic documents can ensue dependent on the respective semantic interpretation of the target subjects.

In the form of a flowchart, FIG. 8 shows a method for speech recognition upon employment of a digital dictionary that was built up by the method.

In this method, a word spoken by the user B is registered 801, the word is sampled, i.e. digitalized 802, and the word is divided 803 into an arbitrary number of voice signal parts.

Feature vectors are formed 804 for the individual voice signal parts, for example by Fourier transformation. Probabilities with which how probable the respective sequence of feature vectors is for a phoneme is indicated are determined 805 upon employment of a method for distance calculation between the formed feature vectors and stored feature vectors of the phoneme sequences or individual segments of the phonemes as well. Subsequently, the word—represented by the phoneme sequence—is sought in the digital dictionary, for example according to what is referred to as the Viterbi method or the method of dynamic programming as well the word is sought in the digital dictionary. [sic]

In a last step 803, the recognized word is brought to the attention of the user B in an output unit. For example, the output unit can be a picture screen, a loudspeaker or a printer, as well.

Although other modifications and changes may be suggested by those skilled in the art, it is the intention of the inventors to embody within the patent warranted hereon all changes and modifications as reasonably and properly come within the scope of their contribution to the art.

I claim:

1. An arrangement for producing a speech recognition phoneme dictionary for use in active speech recognition use by an application, comprising:
    a first memory continuously storing, while the dictionary is active for speech recognition use by the application, standard words and phoneme sequences corresponding to the standard words;
    a first means for the selection and read-in of arbitrary electronic documents to which the arrangement has access, where one of the documents is selected when the application requires access to the one of the electronic documents;
    a text-phoneme converter forming phoneme sequences corresponding to the added words from the one of the documents selected, where the converter is coupled to the first means and a second memory;
    the second memory temporarily maintaining storage of the added words and of the phoneme sequences of the added words formed by the text-phoneme converter until no longer needed by the application, whereby at least the standard words, the added words and the phoneme sequences are contained in the digital dictionary; and
    a second means used by the application for continuous speech recognition that employs the content of the digital dictionary as a search range for the continuous speech recognition, both before and after the second memory maintains storage of the added words.

2. An arrangement for producing a digital dictionary for use in active speech recognition by an application, comprising:
    a first memory continuously storing; while the dictionary is active for speech recognition use by the application, standard words and corresponding phoneme sequences, where the first memory comprises a base search range against which the application compares phoneme sequences;
    a first means for the selection and read-in of at least one of electronic documents to which the arrangement has access, where the selection occurs when the application requires access to the one of the electronic documents;
    a selection means for selecting, from the at least one of the electronic documents, words that are added to a second memory of the active digital dictionary;
    a text-phoneme converter forming phoneme sequences corresponding to the added words from the one of the documents selected, where the converter is coupled to the first means and a second memory; and
    the second memory temporarily maintaining storage of the added words and the phoneme sequences of the added words formed by the text-phoneme converter until no longer needed by the application, whereby at least the standard words, the added words and the phoneme sequences are contained in the digital dictionary, where the first memory area and second memory area together comprise a temporarily expanded search range against which the application compares phoneme sequences for speech recognition.

3. An arrangement according to claim 2, further comprising:
    a decision unit for selection of the added words from the electronic documents that were determined by a second means for speech recognition that employs the content of the digital dictionary for the speech recognition, and wherein the added words selected by said selection means are specific to an application using the dictionary.

4. An arrangement according to claim 2, further comprising:
    a third memory for storing predetermined reserve words and phoneme sequences allocated to the reserve words that are temporarily stored in every application dependent on the application, wherein the phoneme sequences of the reserve words exhibit a higher quality than the phoneme sequences that are formed by the text-phoneme converter.

5. An arrangement according to claim 4, wherein the plurality of reserve words is greater than the plurality of standard words.

6. An arrangement according to claim 4, further comprising:
    a fourth memory for storing speech feature vectors of sayings and/or words that are prescribed by a user, wherein the speech feature vectors respectively characterize a part of the word; and
    a means for comparing user feature vectors of a part of a digitalized voice signal that characterize a part of the digitalized voice signal to at least one of stored phoneme feature vectors and stored speech feature vectors, wherein the phoneme feature vectors respectively characterize the phoneme, and the speech feature vectors respectively characterize a part of the word.

7. A method for constructing a digital dictionary for active speech recognition use by an application, the dictionary including standard words and phoneme sequences allocated to the standard words that are continuously stored in a first memory while the dictionary is in active use by the application, with assistance of a computer, comprising:
    determining one of electronic documents that include words when the application requires access to the one of the electronic documents;

selecting, from the determined one of the electronic documents, words that are temporarily added to a second memory of the digital dictionary;

forming a phoneme sequence characterizing each added word with a text-phoneme converter, said phoneme sequences being allocated to the respective added words selected from the one of the electronic documents; and temporarily maintaining storage of the added words and the phoneme sequences allocated to the added words in a second memory and temporarily assigning the added words and the phoneme sequences to the digital dictionary until no longer needed for speech recognition by the application, whereby the digital dictionary is used as a temporarily expanded search range for continuous phoneme-sequence processing by the application before and after the words selected from the one of the electronic documents are added to the digital dictionary.

8. A method according to claim 7, wherein the determination of the electronic documents ensues according to at least one of the following rules:

determining an unambiguous allocation of the electronic documents;

recognizing spoken words of a user by an arrangement for speech recognition having; a first means and a text phoneme converter and a second memory and a second means and the determination ensues on the basis of the recognized words and on the basis of a predetermined, first rule base;

recognizing spoken words of a user by the arrangement for speech recognition and the determination ensues on the basis of the recognized words and on the basis of a predetermined, first rule base in an interactive dialogue between the arrangement for speech recognition and the user; and storing information characterizing the document type for each document type of the electronic documents, the electronic documents being determined on the basis of said information.

9. A method according to claim 8, wherein the selection of the added words from the electronic documents ensues according to at least one of the following procedures:

those words from the electronic documents that are marked in at least one prescribable way in the electronic documents are selected from the electronic documents as added words;

the selection ensues on the basis of a predetermined second rule base;

those words from the electronic documents are selected as added words that are marked in at least one prescribable way in the electronic documents and that exhibit an importance factor derived from the marking that is greater than a prescribable plurality of importance factors of other words;

those words from the electronic documents that are marked in at least one prescribable way in the electronic documents are selected from the electronic documents as added words, whereby the markings that are employed for the selection of the added words are determined from a particular of a document type of the respective electronic document.

10. A method according to claim 7, wherein predetermined reserve words and phoneme sequences allocated to the reserve words are temporarily stored in every application dependent on the application and are assigned to the dictionary, the phoneme sequences of the reserve words exhibit a higher quality than the phoneme sequences that are formed by the text-phoneme converter.

11. A method according to one of the claim 8, further comprising:

dividing a digitalized voice signal spoken by a user into an arbitrary plurality of digital voice signal parts;

implementing the following steps for each voice signal part for a prescribable plurality of voice signal parts:
determining a user feature vector that characterizes the voice signal part for the voice signal part;
determining a respective similarity value of the user feature vector with the respective phoneme feature vector from a comparison of the user feature vector to at least an arbitrary plurality of phoneme feature vectors that respectively characterize a stored phoneme;
storing the similarity values;

determining a sequence of phonemes for the digitalized voice signal with which the digitalized voice signal is described on the basis of the similarity values; and storing the digitalized voice signal and the sequence of phonemes allocated to the digitalized voice signal in a fourth memory.

12. A method for speech recognition upon employment of a digital dictionary for active speech recognition use by an application that includes standard words and phoneme sequences allocated to the standard words that are continuously stored in a first memory during the active speech recognition use, the method comprising:

determining electronic documents that include words;

selecting, from the determined electronic documents, words that are temporarily added to a second memory of the digital dictionary when the application requires access to the electronic documents or words therein;

forming a phoneme sequence characterizing each added word with a text-phoneme converter, said phoneme sequences being allocated to the respective added words selected from the determined electronic documents;

temporarily storing the added words and the phoneme sequences allocated to the added words in a second memory and temporarily assigning the added words and the phoneme sequences to the digital dictionary for speech recognition until no longer needed by the application, whereby the digital dictionary is used as a search range for continuous phoneme-sequence processing by the application before and after the words are added; and the determination of the electronic documents comprising:
determining an unambiguous allocation of the electronic documents;
recognizing spoken words of a user by speech recognition and the determination ensues on the basis of the recognized words and on the basis of a predetermined, first rule base;
recognizing spoken words of the user by speech recognition and the determination ensues on the basis of the recognized words and on the basis of a predetermined, first rule base in an interactive dialogue between the user and an arrangement implementing the speech recognition; and
storing information characterizing a document type for each document type of the electronic documents, the electronic documents being determined on the basis of said information.

13. A method according to claim 12, further comprising:

dividing a digitalized voice signal spoken by a user into an arbitrary plurality of digital voice signal parts;

forming a sequence of feature vectors with which the digitalized voice signal is characterized from the digitalized voice signal parts; and determining a sequence of phonemes that is most similar to the sequence of feature vectors with respect to a similarity criterion; on a basis of the feature vectors in the feature space;

wherein a recognized word derives from the sequence of phonemes.

14. A method for speech recognition using and temporarily expanding a word-phoneme-sequence speech recognition dictionary for active speech recognition use by an application, comprising:

recognizing spoken words by finding corresponding phoneme sequences in the word phoneme-sequence dictionary, which maps between the phoneme sequences and the words corresponding to a general semantic context used by the application;

receiving a first spoken word and generating a first phoneme sequence for the first spoken word;

speech-recognition processing the first phoneme sequence with the dictionary to identify a first text word corresponding to the first spoken word;

identifying a specific semantic context for use by the application based on the identified first text word;

dynamically and temporarily expanding the speech recognition dictionary by adding new mappings between new phonetic sequences and new text words that correspond to the identified specific semantic context;

recognizing a spoken word using the phonetic sequences corresponding to the general and specific contexts of the expanded dictionary; and removing the new mappings from the dictionary when the application is done using the specific semantic context, and then continuing to perform speech recognition using the dictionary.

15. A method for producing phoneme sequences in a dictionary for speech recognition, the dictionary comprising a dynamic set of text-phoneme definitions, the method comprising:

performing speech recognition during an execution of an application using the set of text-phone definitions, thereby recognizing a first spoken word;

during the execution of the application, adding new text-phoneme definitions to the set of definitions, based on the recognized first spoken word;

during the execution of the application, performing speech recognition using the added-to set of text-phoneme definitions, thereby recognizing a second spoken word;

removing the new definitions from the set when it is determined that the new definitions are no longer needed by the application; and after the removing and during the execution of the application, performing speech recognition using the set of reduced text-phoneme definitions.

16. The method according to claim 15, wherein said adding further comprises selecting a document based on the recognized first word, selecting words in the selected document, and generating the new text-phoneme definitions for the selected words.

17. The method according to claim 16, wherein selecting the words comprises one of locating tagged or marked words in the document, using a rule base, and assessing a relevancy of a word.

* * * * *